Dec. 13, 1938.  A. J. LEWIS  2,140,019
POSITIONING DEVICE
Filed April 1, 1937  4 Sheets-Sheet 1

INVENTOR.
Arthur J. Lewis
BY
Wooster & Davis
ATTORNEYS.

Dec. 13, 1938.　　A. J. LEWIS　　2,140,019
POSITIONING DEVICE
Filed April 1, 1937　　4 Sheets-Sheet 2

INVENTOR.
Arthur J. Lewis
BY Wooster & Davis
ATTORNEYS.

Dec. 13, 1938.　　　　　A. J. LEWIS　　　　2,140,019
POSITIONING DEVICE
Filed April 1, 1937　　　4 Sheets-Sheet 3

INVENTOR.
Arthur J. Lewis
BY Wooster & Davis
ATTORNEYS.

Dec. 13, 1938.  A. J. LEWIS  2,140,019
POSITIONING DEVICE
Filed April 1, 1937  4 Sheets-Sheet 4

INVENTOR
Arthur J. Lewis
BY Wooster & Davis
ATTORNEYS

Patented Dec. 13, 1938

2,140,019

UNITED STATES PATENT OFFICE 2,140,019

POSITIONING DEVICE

Arthur J. Lewis, Stratford, Conn., assignor to The Baird Machine Company, Bridgeport, Conn., a corporation of Connecticut Application April 1, 1937, Serial No. 134,294

21 Claims. (Cl. 29—38)

This invention relates to a positioning device for machine tools having one or more rotatable spindles which carry the work to be operated upon, and has for an object to provide automatic means to insure that for each loading operation the chuck or work holding means is always in the proper location for inserting the work in the chuck or holder and clamping it therein to facilitate loading and unloading of the chuck or holder, and reduce the time required for the loading and unloading operation.

Other objects and advantages will become apparent as the description of the invention is taken in connection with the accompanying drawings forming a part of this specification, it being understood that various modifications and variations may be employed within the scope of the invention. In these drawings.

Figure 1:
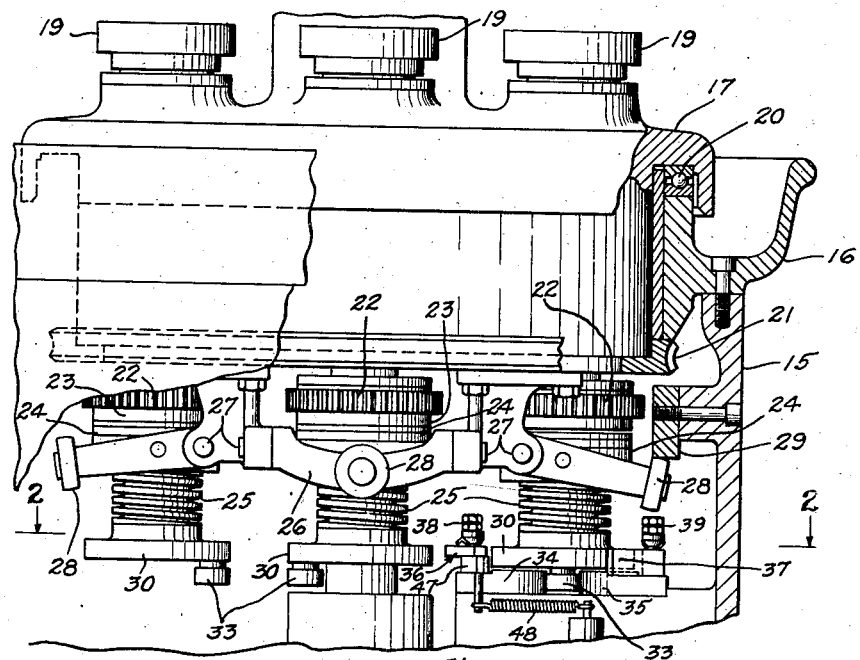
Fig. 1 is a partial side elevation and a partial vertical section of a multiple spindle machine tool embodying one form of the invention.

In the operation of machine tools where the work is carried in a chuck or holder on a rotating spindle, it will be obvious that the operation of removing a finished piece from the holder and mounting an unfinished piece therein for the next working operation can be greatly facilitated if, when the spindle is stopped for these operations, it is always automatically stopped or brought to the same position, so as to locate the chuck jaw operating means in the best position for operation by the operator, or in the case of irregular work it is always brought to the same and most advantageous position for insertion of this work in the holder. This is true not only in single spindle machines, but is also especially true in multiple spindle machines, where a turret carrying a plurality of these spindles is rotated to bring the spindles successively to an unloading and loading station to permit removal of a finished piece from a spindle at this station and insertion of an unfinished piece in the holder or chuck on the spindle at this station, while various working operations are being formed on the work carried by the spindles at the other stations, as it will be seen that the movement of the turret must be timed to give the operator the necessary time interval to remove the finished piece from the holder and insert a new piece therein. It will be evident that if the spindle is capable of stopping in any one of an infinite number of positions about its axis of rotation, the operator may be required to give the spindle various amounts of turning movements in each operation to bring the holder to the proper position to permit removal of the finished piece and insertion of the unfinished piece. It is therefore the main object of the present invention to provide means so that the spindle at the loading station is always in the proper position, and is automatically placed in this position for the unloading and loading operations, so that the operator is not required to turn the holder or spindle before removing or inserting the work.

This result can be accomplished in a number of different ways, four different examples being shown in the accompanying drawings. These results can be accomplished either by stopping the work carrying spindle in a definite loading position, or, after the spindle has been stopped or substantially so, some means may act automatically to bring it to the correct loading position.

Referring first to Figs. 1 to 4, one form of the device is shown applied to a multiple spindle machine tool having vertical spindles, in which the turret carrying the spindles is rotated continuously, but it will be evident the spindle locating device may be used in machines where the turret is indexed intermittently with a step by step movement, and it could be used in machines having horizontal spindles. In the machine shown a base 15 carries a ring 16 on which is mounted a turret 17 carrying a plurality of vertical spindles 18, these spindles carrying suitable chucks or holders, indicated diagrammatically at 19, for carrying the work to be operated upon. The turret is mounted to turn on any suitable bearing 20 to bring the chucks or work holders 19 to the loading station at one side of the machine. This machine as indicated is of the type in which the turret is constantly rotated at a relatively slow speed, say for example at about 1 revolution per minute, and the tools, which are not shown in the present drawings, move with the turret. As the spindles come successively to the loading position their drive means is disconnected and their rotation stopped to permit the operator to remove the finished piece of work from the chuck or holder and to insert an unfinished piece therein.

In the present instance the turret carries a worm gear 21 by which the turret is rotated at the proper speed by a suitable drive not shown. Each spindle carries a gear 22 meshing with a central gear, not shown, by which the spindles are rotated. Associated with each gear 22 is a friction drive clutch, one element of which is indicated at 23, and the other element of which 24 is splined to the spindle and is movable toward and from the element 23 for frictional drive of the spindle from the gear 22, which is free to rotate on the spindle when the clutch is released. Springs 25 are provided tending to move the element 24 of the clutch into engagement with the element 23. Associated with each spindle is a device for releasing the clutch at the loading station, so that rotation of the spindle may be arrested, that shown comprises a forked lever 26 pivoted at 27 and connected to the clutch element 24. This lever carries a roller 28 which runs onto a cam 29 at the loading station, which cam forces the lever downwardly, as indicated at the right of Fig. 1, to release the clutch on the spindle as it moves to the loading station and hold the clutch released while the spindle is at this station to permit loading and unloading of the chuck or work holder while at this station. After the loading operation has been completed the roller 28 runs off the cam permitting the clutch to close to drive the spindle for a working operation.

Figure 4:
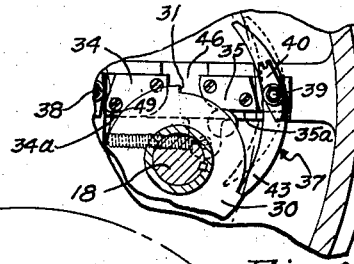
Fig. 4 is a similar view showing another position.
Figure 3:
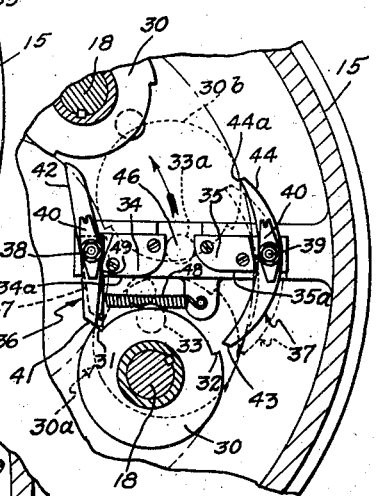
Fig. 3 is a view of a portion of the device on the same plane as Fig. 2 showing different positions of various elements.
Figure 2:
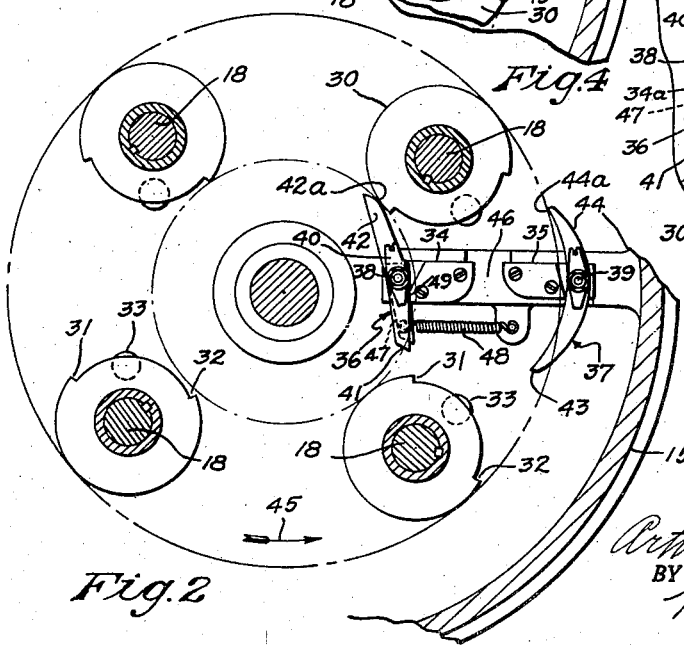
Fig. 2 is a transverse section thereof substantially on line 2—2 of Fig. 1.

The form of device for always insuring that each and every spindle is in the same angular position at this loading station is shown more clearly in Figs. 2 to 4. On each spindle, and secured to the spindle so as to rotate with it, is a member 30, shown in the present case as a sort of flange having a recess on one side providing shoulders 31 and 32. On one side of this member and between the shoulders 31 and 32 is a stud or roller 33 adapted to cooperate with cam elements 34 and 35 located in the plane of the member 33 and mounted on a stationary part of the machine. Associated with these cam elements are pivoted pawls 36 and 37, these pawls being pivoted at 38 and 39 respectively on the frame of the machine, and engaging each pawl on one surface thereof is a spring plate 40 forming a yielding friction means for holding the pawls in either of two different positions. The pawl 36 has a shoulder 41 at its forward end to, under certain conditions, engage the shoulder 31 on the member 30 carried by the spindle, and the rear arm 42 of this pawl is arranged to engage the flange 30 to be shifted thereby to its normal position. The pawl 37 has a shoulder 43 at its forward end adapted under certain conditions to engage the shoulder 32 on the member 30, while its rear end 44 may be engaged by the member 30 to shift the pawl, as will later be described.

Referring now to Fig. 2 the turret 17 is indicated by the arrow 45 as rotating counter-clockwise, and of course carrying with it the spindles 18. As a spindle moves toward the pawls 36 and 37 the roller 28 for this spindle runs up on the cam 29 to release the driving clutch of the spindle, and the spindle stops rotating. Brake means, not shown, may be provided if desired to cause the spindles to stop relatively quickly. It will, however, be seen that the spindle may stop in any one of the positions about the axis of rotation, but for proper removal of finished work from and insertion of unfinished work in the chuck or holder 19 it should be brought to a given definite angular position about its axis of rotation. This is accomplished by the cams 34 and 35 and the pawls 36 and 37 cooperating with the roller 33, member 30, and associated elements.

If the spindle is stopped in such position that on forward movement of the turret the roller 33 engages the forward straight horizontal wall 34a or 35a of one of the cams 34 or 35, then as the spindle moves forwardly this engagement of the roller on the cam element turns the spindle a partial revolution to the right or left to bring the roller 33 to the rear of the spindle, and it passes through the space 46 between the cam elements, positioning the spindle and its chuck in the corresponding definite position, indicated by dotted lines 30b. If, however, the spindle stops with the roller 33 in front as indicated in Fig. 3, then the pawls 36 and 37 and the shoulders 31 and 32 are so located relatively that as the turret moves forwardly to carry the spindle toward the pawls 36 and 37 the forward end of one of these pawls will engage its associated shoulder 31 or 32 on the member 30. We will assume, for example, that the spindle has stopped in a position such that the end of the pawl 36 engages the shoulder 31 as indicated in Fig. 3. Then it will be seen that as the spindle 18 continues its forward movement to the dotted line position 30a the spindle is rotated somewhat to the left, or counter-clockwise, because the shoulder 31 is held stationary by the pawl 36. This swings the roller 33 so that it engages the front straight edge 34a of the cam 34, and as the spindle continues to move forwardly this roller 33 is held by the cam 34 to turn the spindle substantially a half revolution to bring the roller 33 to the rear of the spindle as indicated at 33a so that it may pass through the space 46 between the two cams 34 and 35. It will thus be seen that the spindle is located in the same definite angular position about its axis of rotation as this roller 33 passes through this space 46 between the two cams, as above described. During this operation the forward end 43 of pawl 37 has merely engaged the outer rim of the member 30, and the movement of this member has shifted this pawl to the dotted line position. As the member 30 passes beyond the cams 34 and 35, as indicated at 30b, the rim of the member 30 engages the rear arm 44 of the pawl 37 and shifts this pawl back to the full line position in readiness to engage the shoulder 32 of the following spindle should it stop in the proper position for this operation, as will presently be described. However, during the operation just described where the spindle stopped so that the shoulder 31 was engaged by the pawl end 41 the pawl 37 has had nothing to do with the positioning of the spindle.

We will now assume that after the driving clutch 24 of the spindle has been released the spindle stops in a position that the shoulder 32 engages the end 43 of the pawl 37, and the end 41 of the pawl 36 merely engages the rim of the member 30. Now continued forward movement of the spindle will cause the pawl 37 to turn the member 30 and the spindle to the right or clockwise to bring the roller 33 to the right of the space 46 between the cams 34 and 35 as seen in Fig. 4 and movement of the spindle carries this roller against the forward straight edge 35a of cam 35. Continued forward movement of the spindle therefore again turns the member 30 and the spindle about a half revolution, but this time to the right or clockwise, so that the roller 33 is to the rear of the spindle and passes through the space 46, as shown in the dotted line position 33a of Fig. 3, again bringing the spindle to the same position as it was brought by the pawl 36 as above described. In this case the rim of the member 30 engages the rear end portions 42 and 44 of the pawls 36 and 37 as indicated at 42a Fig. 2 and 44a Fig. 3 respectively, and shifts the forward ends 41 and 43 inwardly to engage the next member 30 as it moves forwardly with the next spindle. It will thus be seen that, as each spindle passes beyond the members 34 and 35 to the loading position, the spindles are each moved to and placed in the same angular position about the axis of the spindle, and it remains in this position while in the unloading and loading position.

It sometimes happens where only pawls 36 and 37 are used that one of them, for example the pawl 36, might just engage the outer edge of the shoulder 31 as indicated in Fig. 3, and then as the spindle moved forward it might slide off this shoulder so that the spindle would not be properly positioned. This would only happen infrequently, but in order to make sure that the spindle never passes to the unloading position without being properly positioned, an auxiliary pawl 47 is pivoted under the pawl 36. This pawl 47 is slightly shorter than the forward arm of the pawl 36 as shown, and a spring 48 tends to draw it toward the path of the spindles, but this movement is limited by a stop shoulder 49. Thus should the pawl 36 engage the edge of the shoulder 31 and slide off it this shorter pawl 47 will engage the shoulder 31 as indicated in Fig. 3 and will properly position the spindle.

Figure 5:
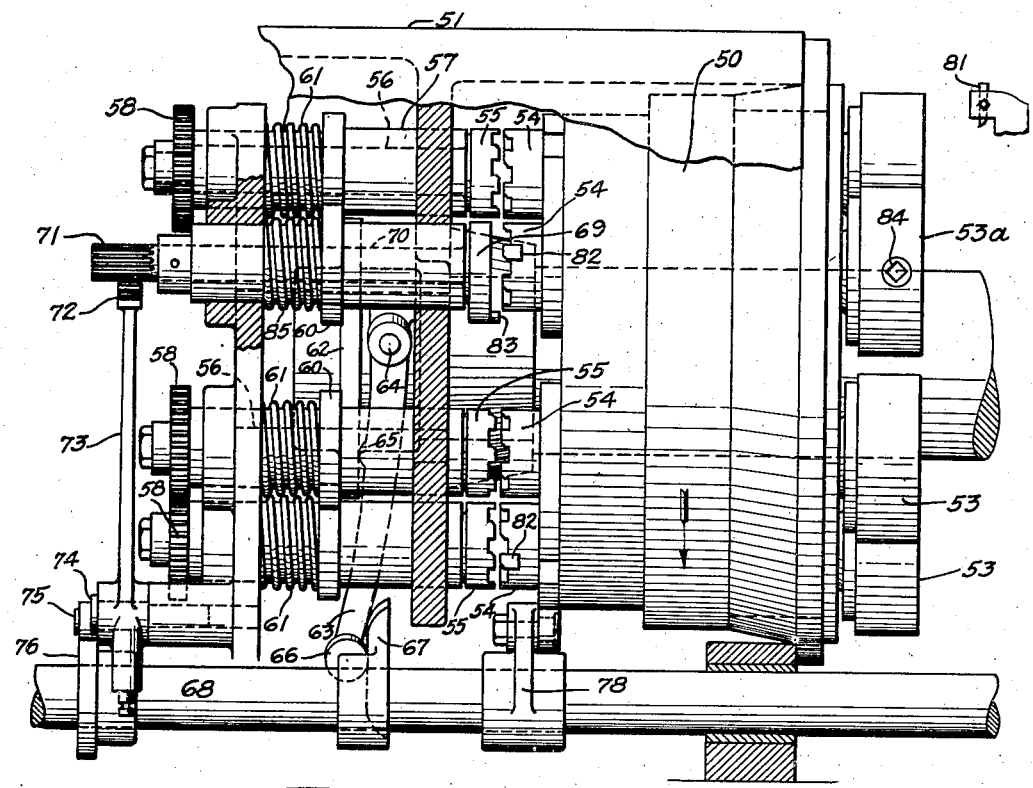
Fig. 5 is a partial side elevation and a partial vertical section of another form of multiple spindle machine tool showing another type of the invention.
Figure 6:
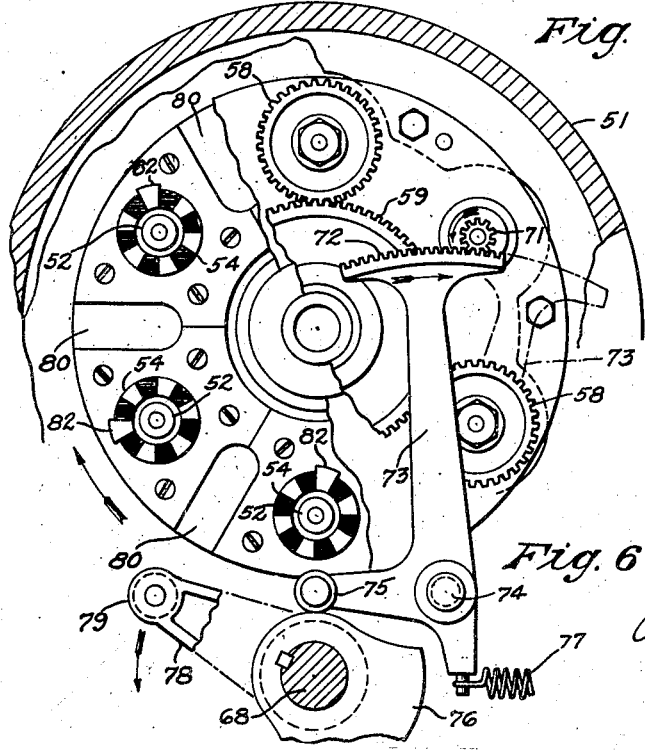
Fig. 6 is a partial section and a partial elevation looking from the left of Fig. 5.
Figure 7:
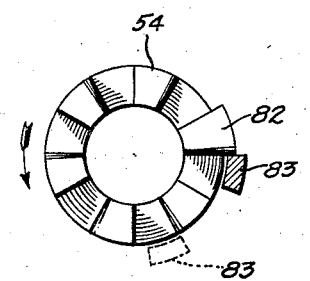
Fig. 7 is a detailed view of the end of the spindle at the loading station.

In Figs. 5 to 7 is shown a different form of device for positioning the spindles in the desired angular position about their axes in the loading station. In this machine the turret 50 mounted in the frame 51 rotates about a horizontal axis, and carries the work spindles 52 carrying the chucks or work holders 53. Each spindle has a clutch jaw 54 at its inner end adapted to mesh with a slidable clutch jaw 55 on driving shafts 56. These clutch jaws 55 are carried on the shafts 56 mounted in bearing sleeves 57 mounted for longitudinal sliding movement in the frame 51, and are driven by gears 58 meshing with a central gear 59 driven from any suitable source of power, not shown. These sleeves have a flange 60 between which and the frame is a spring 61 tending to shift the shafts and members 55 into engagement with the clutch member 54, and thus drive the work spindles 52. On the opposite sides of these flanges 60 and in engagement therewith is a member 62 which is shiftable to the left as viewed in Fig. 5 to shift the shafts 56 and the clutch members 55 to the left to release the clutch members 55 from the clutch members 54 to stop operation of the work spindles and rotation of the work holders or chucks 53 during the indexing operation. This member 62 is shifted by a lever 63 pivoted at 64 and engaging the flange 62 at 65. This arm carries a roller 66 adapted to be engaged at the proper time just prior to each indexing operation by a cam 67 on the indexing or cam shaft 68.

This shaft 68 is rotated continuously, and on each revolution indexes the turret one step, or the distance between two work spindles, to bring these spindles and their chucks successively to the unloading and loading station indicated at 53a. The clutch head 69 on the shaft 70 in alignment with the working spindle at this loading station is, however, free of clutch driving teeth to mesh with the clutch 54, as will be seen in Fig. 5. This shaft has no driving gear 58 so is not driven from the gear 59, but it has a pinion 71 meshing with a rack 72 on an arm 73 of a bell-crank lever pivoted at 74. The other arm of this lever carries a roller 75 running on a cam 76 on the shaft, a spring 77 holding this roller against the cam. The shaft 68 carries an indexing arm 78 carrying a roller 79 adapted on each revolution to enter a radial slot 80 in the turret, and thus index the turret a given amount for each revolution of the shaft 68 to bring the work spindles successively to the loading station 53a. The other five shafts 56 in the remaining five positions are each driven from the gear 59 and are in alignment with the remaining five work spindles, so that these five spindles which are in the working positions can be driven simultaneously. Suitable tools, such for example as shown at 81, may be located at these working stations to perform the desired operations on the work at these stations.

This mechanism for intermittently indexing the turret, disconnecting the drive from the work spindles during the indexing operation, and then automatically connecting the drives with the spindles at the working stations between the indexing operation is similar to that shown in my prior patent for Chucking machine No. 1,900,387.

It will be seen from the drawings that each clutch member 54 has a lug 82 projecting beyond its periphery, and that although the member 69 on the shaft 70 in alignment with the work spindle in the loading position 53a has no teeth to engage the clutch teeth of the clutch 54, it has a lug 83 which may engage the lug 82 when the shafts 56 and 70 are moved to the right to the driving position. The lugs 83 and 82 cooperate to locate the work spindle and the chuck 53 at the proper angular position about the axis of the spindle at the loading station 53a, to bring, for example, the chuck jaw operating means 84 to the front, as indicated in Fig. 5 where it is easy for the operator to insert his operating tool, such as a wrench, to release the jaws of the chuck to release the finished piece of work and to clamp these jaws on the unfinished work piece.

Immediately after the indexing operation the roller 66 runs off the cam 67 permitting the springs 61 to shift the shafts 56 and the clutch members 55 to the right at the working stations to engage the clutch members 54 on the work spindles at the working stations. At the same time the spring 85 on the sleeve carrying the shaft 70 in alignment with the roller at the loading station 53a is shifted to the right to bring the lug 83 in the path of movement of the lug 82. Then the roller 75 runs up on the cam 76 shifting the arm 73 and the rack 72 to the right as viewed in Fig. 6, and rotating the pinion 71 and the shaft 70. This moves the lug 83 against the lug 82 and turns the work spindle carrying the chuck 53a to a given angular position, this being the chuck at the loading station and is on the spindle which is not driven from the power means. It will thus be seen that, as the arm 73 is given a definite movement by the cam 76, the lugs 83 and 82 are brought to a given definite position on each operation of the lever 73, which, as indicated, is the position with the chuck operating means 84 at the front where it is easily accessible to the operator. Thus each work spindle and each chuck 53 is automatically brought to this same angular position about its axis of rotation after the spindle has been brought to the loading station, and they are located in the same angular position while at this station.

Figure 8:
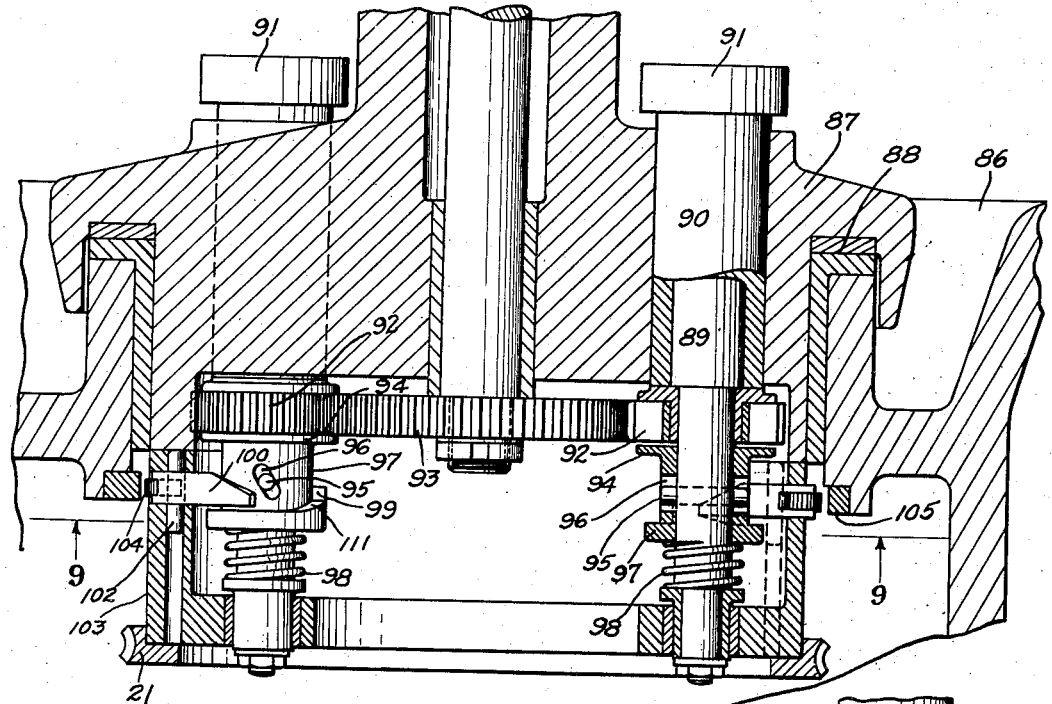
Fig. 8 is a vertical section of a portion of a multiple spindle machine tool showing another form of the invention.
Figure 10:
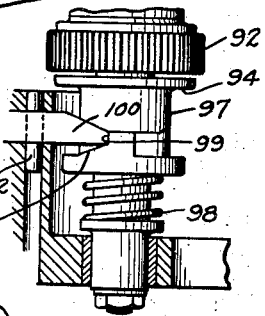
Fig. 10 is a side elevation of a portion of one of the spindles and the locating mechanism with certain associated elements in section.
Figure 9:
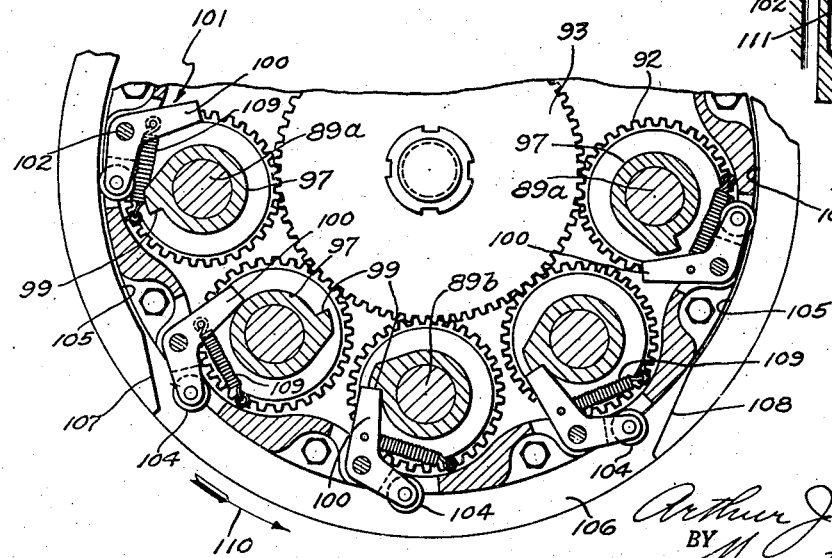
Fig. 9 is a transverse section thereof substantially on line 9—9 of Fig. 8.

Figs. 8 to 10 show a somewhat different arrangement which does not shift the work spindles angularly about their axis after they have stopped, but operates to stop each spindle in the same angular position at the loading position, and thus locates them in the same angular position while at the loading station. This is adapted for use on spindles which are operated at relatively low speeds. It is shown as applied to vertical spindles mounted in a turret rotatable about a vertical axis, but of course could be applied to spindles rotating about a horizontal axis. A portion of the frame of the machine is indicated at 86 in which the turret 87 is mounted to turn in a bearing 88. This turret carries any suitable number of work spindles 89 running in any suitable bearings 90 in the turret. These spindles carry chucks or work holders 91. Mounted to rotate freely on the spindles are driving gears 92 meshing with a central gear 93, the gears 92 forming one member of a friction clutch. The other member comprises a friction flange or plate 94 secured to the spindle 89 so as to turn therewith, but slidable to and from frictional engagement with the gear 92. In the present instance the spindle carries a pin 95 extending into inclined elongated slots 96 in the sleeve 97 carrying the flange or plate 94. A spring 98 tends to move the sleeve 97 and the plate 94 into engagement with the member 92. This sleeve 97 carries a stop lug 99 adapted under certain conditions to engage the end 100 of a pawl 101 pivoted at 102 in the head member or spider 103 secured to and moving with the turret 87. The pawls 101 are in the form of bellcrank levers, the other end of which carries a roller 104 adapted to run on the inner surface of the cam member 105, which is cut away on one side at 106 with inclined cam surfaces 107 and 108 on the opposite ends thereof. A spring 109 connected to each pawl 101 tends to move the end 100 inwardly toward the sleeve 97 into the path of movement of the lug 99 and to hold the roller 104 against the cam 105.

In the case shown the turret 87 is rotated at a constant speed, by a worm gear 21 from any suitable drive means, not shown, and the tools, not shown, for operating on the work carried by the chucks 91 move with the turret. During normal working operations the rollers 104 run on the inside surface 105 of the broken ring cam and hold the ends 100 of the pawl out of the path of the lugs 99, as will be seen by the spindles 89a of Fig. 9. This permits the clutch spring 98 to shift the sleeve 97 to bring the friction flange 94 into engagement with a corresponding gear 92 to drive the spindles. If now the turret is rotating as indicated by the arrow 110, it will be seen that as the roller 104 runs off the inclined cam surface 107, as shown at the lower left of Fig. 9, it permits the end 100 on the pawl to move inwardly toward the sleeve 97 into the path of movement of the lug 99, and continued movement of this sleeve with the spindle 89 will bring this lug against the end 100, as indicated at the bottom of Fig. 9 on the spindle 89b. This pawl therefore by engaging the lug 99 prevents further rotative movement of the sleeve 97. Just before the end 100 of the pawl engages the lug 99 it engages the inclined cam surface 111 on the sleeve 97 immediately in front of the lug 99 and shifts the sleeve 97 downwardly against the action of the spring 98 to move the friction plate 94 away from the driving gear 92, and thus disconnect the drive for the spindle. It will thus be seen that the drive for the spindle will be automatically disconnected before the stop lug 99 engages the end 100 of the pawl, and therefore when this lug engages the pawl the spindle is stopped in this position. To relieve the sudden shock of stopping the spindle the slot 96 is inclined as shown at the left of Fig. 8, so that momentum of the spindle causes the pin 95 to slide on the inclined wall of the slot and by a camming action shift the sleeve 97 somewhat against the spring 98, bringing the spindle to rest without objectionable shock.

It will be seen the spindle is now in a definite given position, as the lug 99 is against the pawl 100, and it remains there while the spindle is in loading position, and the tightening and releasing means for the work holding chuck can be correspondingly located for most advantageous manipulation by the operator. Shortly after the work has been placed in the holder and clamped therein by the operator, continued movement of the turret causes the roller 104 to run up on the inclined cam 108 to move the pawl end 100 away from the lug 99 and the cam 111, permitting the sleeve 97 to be shifted by the spring 98 to engage the friction plate 94 with the driving gear 92 to operate the spindle. It will thus be seen that each spindle as it comes to the loading position is automatically stopped in the same relative angular position about its axis of rotation, and each work holding chuck is stopped in the same angular position for removal of the finished piece of work and insertion of a new or unfinished piece. Although the turret in this form of device just described is rotated continuously, it will be evident this spindle stopping and positioning means can be used with a turret which is operated with a step by step indexing movement.

Figure 11:
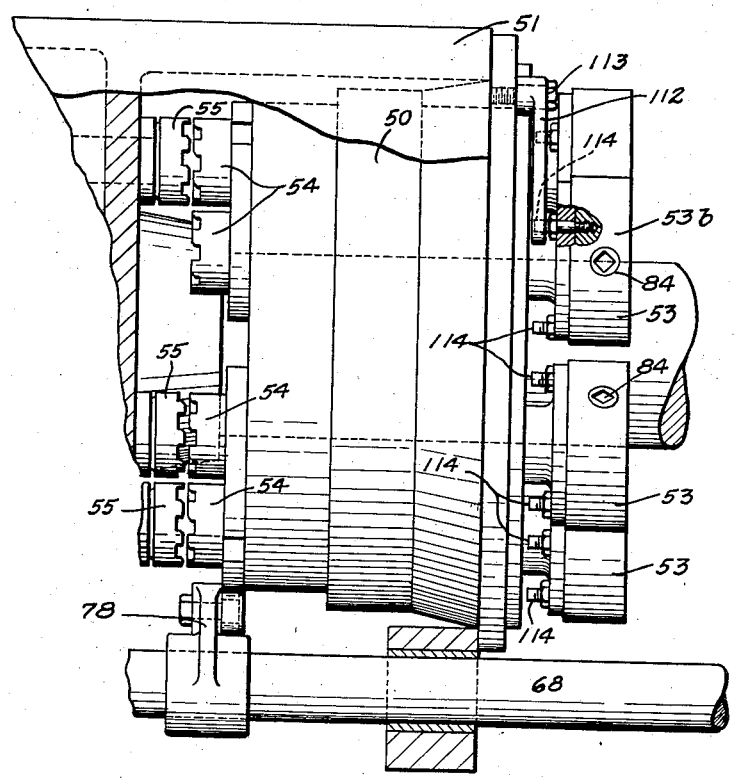
Fig. 11 is a partial side elevation and a partial section of a multiple spindle machine tool showing still another form of the invention.
Figure 12:
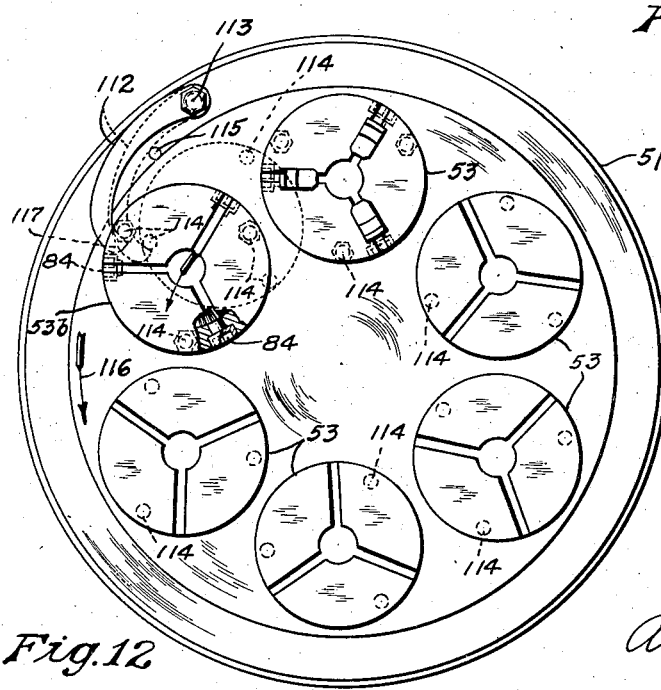
Fig. 12 is a view looking from the right of Fig. 11.
Figure 13:
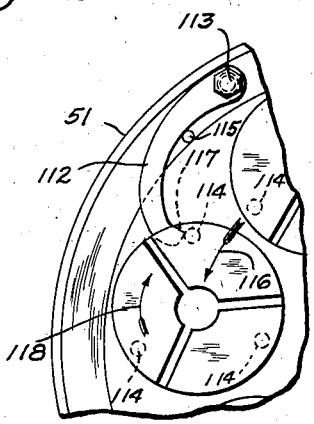
Fig. 13 is a view of a portion of Fig. 12 showing the elements in a different location.

A somewhat different arrangement is shown in Figs. 11 to 13. This device is applied to a turret 50 rotating about a horizontal axis and carrying work spindles which are driven by clutch members 54 and 55, the same as shown in the arrangement of Fig. 5. The means for positioning the spindle in the loading station, however, is somewhat different. The chucks 53 are brought in succession by indexing of the turret to the position 53b the same as in the device of Fig. 5, this position 53b being the loading position corresponding to the loading position 53a of Fig. 5. In this position there is no driving clutch 69 as in the arrangement of Fig. 5, but means is provided at the front of the turret cooperating through the indexing movement of the turret and the movement of the chucks carried thereby to position these chucks at the desired angular position. The device as shown comprises a pivoted hook or pawl 112 pivoted to the frame 51 at 113. Mounted on the back of each of the chucks 53 are a series of stop pins 114. If the chuck has three jaw operating sockets 84 then there will be three of these stop pins 114 mounted at the proper location on the chuck. A stop 115 under the pawl 112 limits its movement inwardly, but the positions of the stops 114 and this stop 115 are so arranged relatively that it doesn't matter at what angular position a work spindle comes to rest before it moves to the loading station. As the turret is indexed in the direction of the arrow 116 to bring the spindle into the loading position 53b, the hooked end 117 of the pawl 112 will engage one of the stops 114, and as the spindle moves into the loading position at the end of the indexing operation, as this particular stop 114 is held stationary by the pawl 112 it will be evident that the chuck 53 and its spindle will be rotated a partial revolution to the right or clockwise in the turret, and as the turret comes to rest one of the chuck jaw operating means 84 is located at the front of the chuck for easy access by the operator to release a finished piece of work and to clamp an unfinished piece in its place.

On the next indexing operation of the turret in the direction of the arrow 116 this spindle and the chuck 53b move forwardly with it, but as the spindle is free to turn it will be held stationary relative to the pawl 112 by the stop 114 engaging the hook 117, but the spindle and the chuck will turn relative to the turret, as indicated by the arrow 118 in Fig. 13, as the turret moves forwardly. This relative rotation of the chuck in the turret carries the stop 114 inwardly away from the hook 117, thus releasing the chuck from this holding pawl 112 and permitting the turret and the spindles to index to carry these spindles to their next positions.

It will be seen that in each of the various arrangements shown and described the spindle at the loading station and the work holding chuck carried thereby are always either stopped in the same angular position about their axis of rotation, or are automatically brought to this position, and are therefore in each case located in the same given angular position at the loading station so that it is never necessary for the operator to turn the chuck or work holder to bring it to the proper position for releasing the work and inserting a new unfinished piece, but the chuck is always properly positioned so that all he has to do is to release the finished piece, remove it from the chuck, insert the unfinished piece, and then clamp it. It will thus be evident that this device greatly facilitates removal of the finished work and insertion of the unfinished work, and reduces the time required for the loading operation.

Having thus set forth the nature of my invention, what I claim is:

1. In a multiple spindle machine tool, a rotatable turret, a plurality of work spindles carried by the turret, means for turning the turret to bring the spindles to a loading station, means for driving the spindles, means for disconnecting the spindles from the driving means at the loading station, cam means, means carried by the spindles to engage said cam means to turn the spindle at the loading station to a given angular position about its axis, and means to shift the spindle under certain conditions to bring said means carried by the spindle into a given relation to the cam means.

2. In a multiple spindle machine tool, a rotatable turret, a plurality of work spindles carried by the turret, means for turning the turret to bring the spindles to a loading station, means for driving the spindles, means for disconnecting the spindles from the driving means at the loading station, cam means, an operating member carried by the spindles to engage the cam means to turn the spindle at the loading station to a given angular position about its axis, pawls adjacent said cam means located on opposite sides of the path of movement of the spindle, and shoulders carried by the spindle to engage said pawls to turn the spindle to a position to cause said operating member to engage the cam means.

3. In a multiple spindle machine tool, a rotatable turret, a plurality of work spindles carried by the turret, means for turning the turret to bring the spindles to a loading station, means for driving the spindles, means whereby the spindle at the loading station is disconnected from the driving means, cam means, operating means carried by the spindles to cooperate with the cam means as a spindle moves to the loading station to turn the spindle to a given angular position about its axis, spaced shoulders on the spindle, pawls on opposite sides of the path of movement of the spindles arranged to engage one of said shoulders to shift the spindle to bring said operating means to a given relation to the cam means, and an auxiliary pawl adjacent one of the first pawls and somewhat shorter to engage the shoulder should the first pawl slip off said shoulder.

4. In a multiple spindle machine tool, a frame, a turret mounted to turn in the frame, a plurality of work spindles carried by the turret, means for turning the turret to bring the spindles to a loading station, means for driving the spindles and disconnected therefrom at the loading station, and cooperating means on the frame and each spindle to turn the spindle to a given angular position about its axis, said latter means being constructed and arranged to be operated by the turning movement of the turret which carries said spindle to the loading station.

5. In a multiple spindle machine tool, a rotatable turret, a plurality of work spindles carried by the turret providing a loading station and work stations, means for indexing the turret with a step by step movement to bring the spindles to the loading station, means for driving the spindles at the working stations, means for disconnecting the driving means from the spindles to permit indexing of the turret, driving means adapted to be shifted to driving connection with the spindle at the loading station, a cam operated in timed relation with the indexing means, and means operated by the cam to operate the driving means a given amount to turn the spindle at the loading station to a given angular position about its axis.

6. In a multiple spindle machine tool, a rotatable turret, a plurality of work spindles carried by said turret, means for turning the turret to bring the spindles to a loading station, means for driving the individual spindles, and means for automatically disconnecting the driving means and stopping the spindle in a given angular position about its axis, said stopping means being constructed and arranged to be operated by the turning movement of the turret which carries said spindle to the loading station.

7. In a multiple spindle machine tool, a rotatable turret, a plurality of work spindles carried by said turret, means for turning the turret to bring the spindles to a loading station, means for driving the individual spindles including a slidable sleeve connected with a clutch member and rotatable with the spindle, a stop shoulder on said sleeve, a cam on the sleeve, a pawl adapted to engage the cam to shift the sleeve to release the clutch and to engage said shoulder to stop rotation of the spindle in a given angular position, and means operable as a spindle moves to the loading station to locate the pawl in the path of movement of the cam and shoulder.

8. In a multiple spindle machine tool, a rotatable turret, a plurality of work spindles carried by said turret, means for turning the turret to bring the spindles to a loading station, a stop shoulder rotatable with a spindle, a pawl adapted to engage said shoulder to stop the spindle in a given angular position, and means controlling the pawl to normally hold it out of the path of movement of the shoulder and cause it to shift into said path as the spindle moves to the loading station.

9. In a multiple spindle machine tool, a rotatable turret, a plurality of work spindles carried by said turret, means for turning the turret to bring the spindles to a loading station, means for driving the individual spindles including a sleeve slidable on the spindle having an inclined slot and connected with a clutch member, a pin connected to the spindle and extending into said slot, a spring tending to shift the sleeve to engage the clutch, a stop shoulder on said sleeve, a pawl normally held out of the path of movement of the shoulder, and means to cause movement of the pawl into the path of said shoulder to stop the spindle in a given angular position as it moves to the loading station.

10. In a multiple spindle machine tool, a rotatable turret, a plurality of work spindles carried by said turret, means for turning the turret to bring the spindles to a loading station, a stop shoulder rotatable with the spindle, a pawl adapted to engage said shoulder to stop the spindle in a given angular position and normally out of the path of movement of the shoulder, means causing movement of the pawl into the path of said shoulder as the spindle moves to the loading station, a resilient means, and means permitting limited rotary movement of the spindle against the action of said resilient means after the shoulder engages the pawl.

11. In a machine of the character described, a continuously revolving turret, a plurality of work carrying spindles on said turret, means for driving said spindles, and means for stopping the spindles successively during a portion of the revolving movement of the turret and locating the stopped spindle in a definite angular position about its axis, said latter means being constructed and arranged to be operated by turning movement of the turret.

12. In a multiple spindle machine tool, a continuously revolving turret, a plurality of work spindles carried by the turret, means for driving the spindles, means for disconnecting said driving means for the spindles in succession during a portion of the rotative motion of the turret, and means for locating the disconnected spindle in a definite angular position about its axis, said latter means being constructed and arranged to be operated by turning movement of the turret.

13. In a multiple spindle machine tool, a continuously revolving turret, a plurality of work spindles carried by the turret, a work holding chuck on each spindle having a hand operated means for releasing and clamping the work, means for driving the spindles, means for disconnecting said driving means from the spindles in succession during a portion of the rotative movement of the turret, and means for locating the disconnected spindle with the hand operated means in a given angular location about the axis of the spindle.

14. In a machine of the character described, a rotatable turret, a plurality of work carrying spindles on said turret, working and loading stations about said turret, means for indexing the turret to bring the spindles successively to the working and loading stations, a separate driving means for each spindle at the working stations, means at the loading station to disconnect the driving means from the spindle at said station, and means at the loading station for automatically locating the spindle at this station in a given angular position about its axis.

15. In a machine of the character described, a rotatable turret, a plurality of work carrying spindles on said turret, working and loading stations about said turret, means for indexing the turret to bring the spindles successively to the working and loading stations, a separate driving means for each spindle at the working stations including clutch means on the spindles and cooperating clutch means cooperating therewith, means for driving the latter clutch means, means for shifting one of said cooperating clutch means to disconnect the drives from the spindles to permit stopping of a spindle at the loading station, and means to automatically locate the spindle at the loading station in a given angular position about its axis of rotation prior to the loading operation.

16. In a machine of the character described, a rotatable turret, work carrying spindles on said turret, working and loading stations about said turret, means for indexing the turret to bring the spindles successively to the working and loading stations, releasable driving means for the spindles, means for automatically releasing the driving means for each spindle as it moves to the loading station, means for turning each spindle to a given angular position about its axis so that the spindles are each in the same angular position at the loading station, and said latter means being constructed and arranged to be caused to function by the movement of a spindle to the loading station.

17. In a machine tool, a work spindle, a work holding means on said spindle including a hand operated means for securing and releasing the work, a releasable drive for operating the spindle for a working operation, means releasing the driving means, and automatic means for locating the spindle to position the hand operated means in a given angular position about the axis of rotation of the spindle after the driving means has been released.

18. In a multiple spindle machine tool including a rotatable turret, a plurality of work spindles carried by said turret, means for driving the spindles, work holding means carried by the spindles and means for rotating the turret to bring the work holding means successively to a loading station, means at the loading station for disconnecting the drive means for the spindle at said station, and means for locating the disconnected work spindle in a given angular position about its axis of rotation while at the loading station.

19. In a multiple spindle machine tool including a rotatable turret, a plurality of work spindles carried by the turret, a work holder carried by each spindle providing a loading station and working stations, a hand operated means on each holder for releasing and clamping the work, means for rotating the turret to bring the work holders successively to the loading station, means for driving the spindles, means for disconnecting the spindle at the loading station from the driving means, and means at the loading station for locating the work holder at this station with the hand operated means in a given angular position about the axis of rotation of the holder.

20. In a multiple spindle machine tool, a rotatable turret, a plurality of work spindles carried by the turret providing a loading station and working stations, a work holding chuck on each spindle having hand operated means for releasing and securing the work, means for indexing the turret to bring the spindles successively to the loading station, means for driving the spindles, means for automatically disconnecting the spindle at the loading station from the driving means, and means to give the spindle at the loading station a partial revolution to bring the hand operated means to a given angular position about the axis of rotation of the spindle.

21. In a multiple spindle machine tool, a rotatable turret, a plurality of work spindles carried by the turret providing a loading station and work stations, work holding chucks on said spindle including hand operated means for opening and closing the chuck, means for indexing the turret with a step by step movement to bring the spindles to the loading station, means for driving the spindles at the working stations, means for disconnecting the driving means from the spindles to permit indexing of the turret, and means operated automatically in certain timed relation with the indexing means to turn the spindle at the loading station to position the hand operated means in a given angular position about the axis of rotation of the chuck.

ARTHUR J. LEWIS.